(12) United States Patent
Suryanarayana et al.

(10) Patent No.: US 9,831,767 B2
(45) Date of Patent: Nov. 28, 2017

(54) MODULATION CIRCUIT FOR ENHANCED LOAD TRANSIENT RESPONSE

(71) Applicant: Texas Instruments Incorporated, Dallas, TX (US)

(72) Inventors: Dattatreya Baragur Suryanarayana, Cary, NC (US); Preetam Tadeparthy, Bangalore (IN); Brian Carpenter, Cary, NC (US); Rama Venkatraman, Cary, NC (US)

(73) Assignee: Texas Instruments Incorporated, Dallas, TX (US)

( * ) Notice: Subject to any disclaimer, the term of this patent is extended or adjusted under 35 U.S.C. 154(b) by 54 days.

(21) Appl. No.: 14/566,136

(22) Filed: Dec. 10, 2014

(65) Prior Publication Data

US 2016/0172965 A1 Jun. 16, 2016

(51) Int. Cl.
*H02M 3/158* (2006.01)
*H02M 3/156* (2006.01)

(52) U.S. Cl.
CPC ......... *H02M 3/156* (2013.01); *H02M 3/1588* (2013.01); *H02M 2003/1566* (2013.01); *H02M 2003/1586* (2013.01)

(58) Field of Classification Search
CPC ....... H02M 1/00–3/158; H02M 3/1582–11/00; H02M 2003/1566; H02M 2003/1588; H02M 2001/0032; H02M 2001/0054
See application file for complete search history.

(56) References Cited

U.S. PATENT DOCUMENTS

| | | | | |
|---|---|---|---|---|
| 6,232,754 B1* | 5/2001 | Liebler | ............... | H02M 3/1584 323/272 |
| 2003/0231012 A1* | 12/2003 | Corva | .................. | H02M 3/156 323/285 |
| 2012/0025919 A1* | 2/2012 | Huynh | ............... | H02M 3/1563 331/34 |
| 2012/0212204 A1* | 8/2012 | Philbrick | .............. | H02M 3/156 323/284 |
| 2014/0152274 A1* | 6/2014 | Lee | ......................... | G05F 1/595 323/271 |

OTHER PUBLICATIONS

A. Costabeber, P. Mattavelli and S. Saggini, "Digital Time-Optimal Phase Shedding in Multiphase Buck Converters," in IEEE Transactions on Power Electronics, vol. 25, No. 9, pp. 2242-2247, Sep. 2010.*

* cited by examiner

*Primary Examiner* — Harry Behm
*Assistant Examiner* — Peter Novak
(74) *Attorney, Agent, or Firm* — Lawrence J. Bassuk; Charles A. Brill; Frank D. Cimino

(57) ABSTRACT

A circuit and method for providing improved load transient response in a DC-DC converter. A DCM modulator is incorporated into the converter controller to generate a DCM enable signal for the driver circuits for the converter. During normal operation, the DCM enable signal will remain in a first state and the driver circuits will operate in a continuous conduction mode. However, upon a load transient, the DCM enable signal will change to a second state and the driver circuits will operate in a discontinuous conduction mode.

14 Claims, 6 Drawing Sheets

US 9,831,767 B2

1

MODULATION CIRCUIT FOR ENHANCED LOAD TRANSIENT RESPONSE

TECHNICAL FIELD

This disclosure relates in general to electronic circuits, and in particular, to a circuit and method for providing an improved output voltage response to a load transient in a DC-DC converter.

BACKGROUND

A microprocessor, or simply processor, such as a central processing unit ("CPU") or a graphics processing unit ("GPU"), is an integral component for computing devices, e.g., laptops and servers, and often demands high current within a short period of time, for example, 100 A in 150 nS. Likewise, a processor may also quickly transition to a low power state, for example, 100 A to 1 A in 100 nS to 150 nS. All such demands must be met by the available power supply circuit, which powers the processor. Other types of loads, such as a large application specific integrated circuit ("ASIC"), a system on a chip ("SoC"), and a field programmable field array ("FPGA") may also exhibit similar behavior.

However, large load transients typically cause undershoot and overshoot in the supply voltage. Undershoot occurs when the transient change in the output voltage of a DC-DC converter exceeds the lower limit of the voltage specification, while overshoot occurs when the transient change exceeds the upper limit of the voltage specification. Thus, undershoot and overshoot specifications are fairly stringent for processor core power rails. A typical specification is 2 mV per ampere. As an example, for a 100 A load transient, the undershoot and overshoot specification associated with the power supply should not be more than 200 mV.

The problem of undershoot and overshoot with load transients has another dimension. Since the processor is running fast and also entering low power modes, the load transients can be in the medium frequency range of 100 Hz to 2 MHz. Typically, medium frequency load transients cause larger undershoot and overshoot than lower frequency load transients due to circulating currents. The circulating currents typically occur when the transients described above excite a resonant LC filter that is used to filter the output ripple to acceptable levels in a step-down converter. This forces the circuit designer to use higher output capacitance in order to meet the stringent undershoot and overshoot specification.

Thus, it would be desirable to handle the load transients with reduced undershoot and overshoot and without the need for increased output capacitance.

2

Figure 1A:
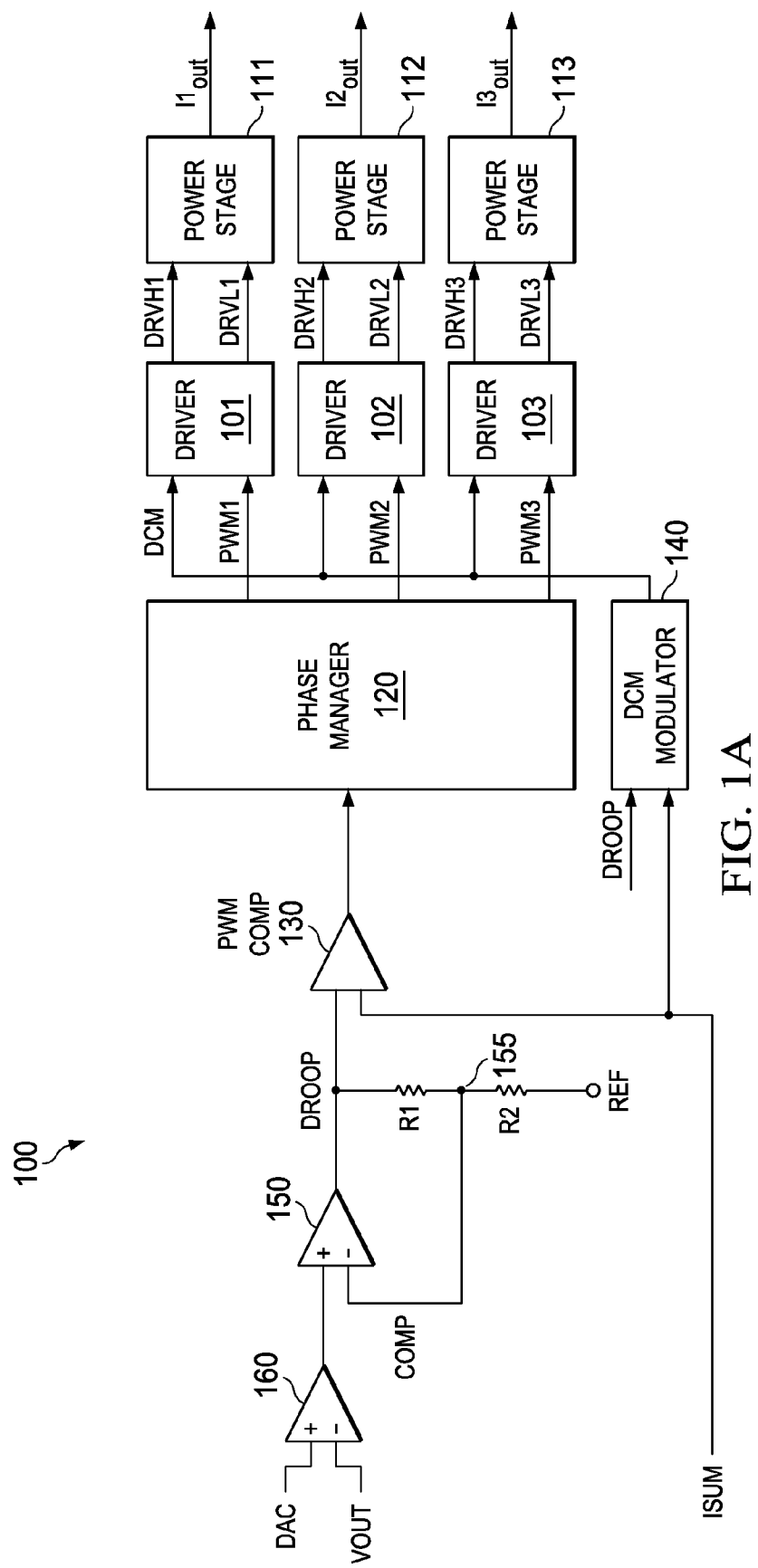
FIG. 1A is a block diagram of a three phase DC-DC controller circuit incorporating a skip modulator circuit.
Figure 4:
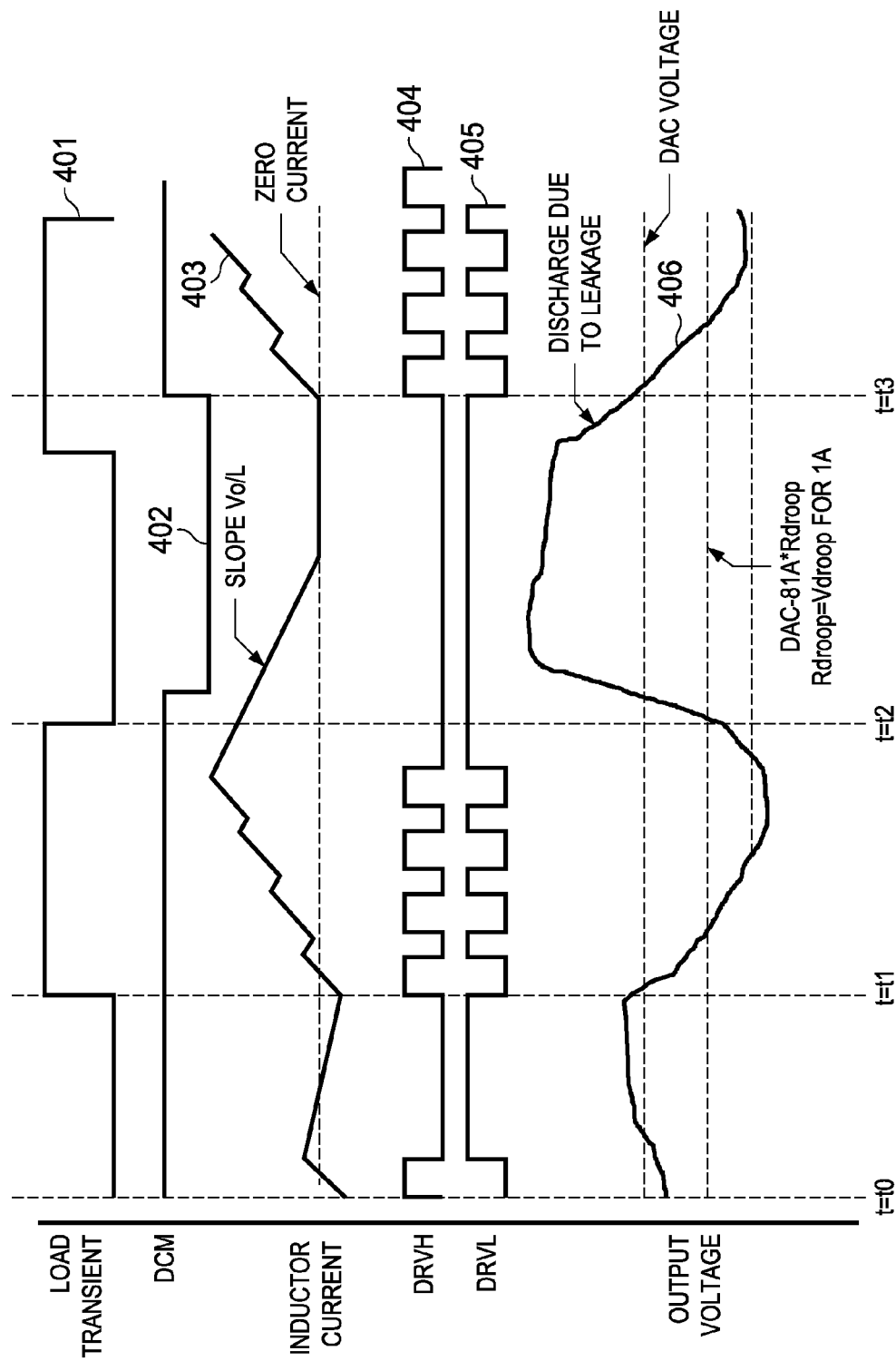
Figure 5:
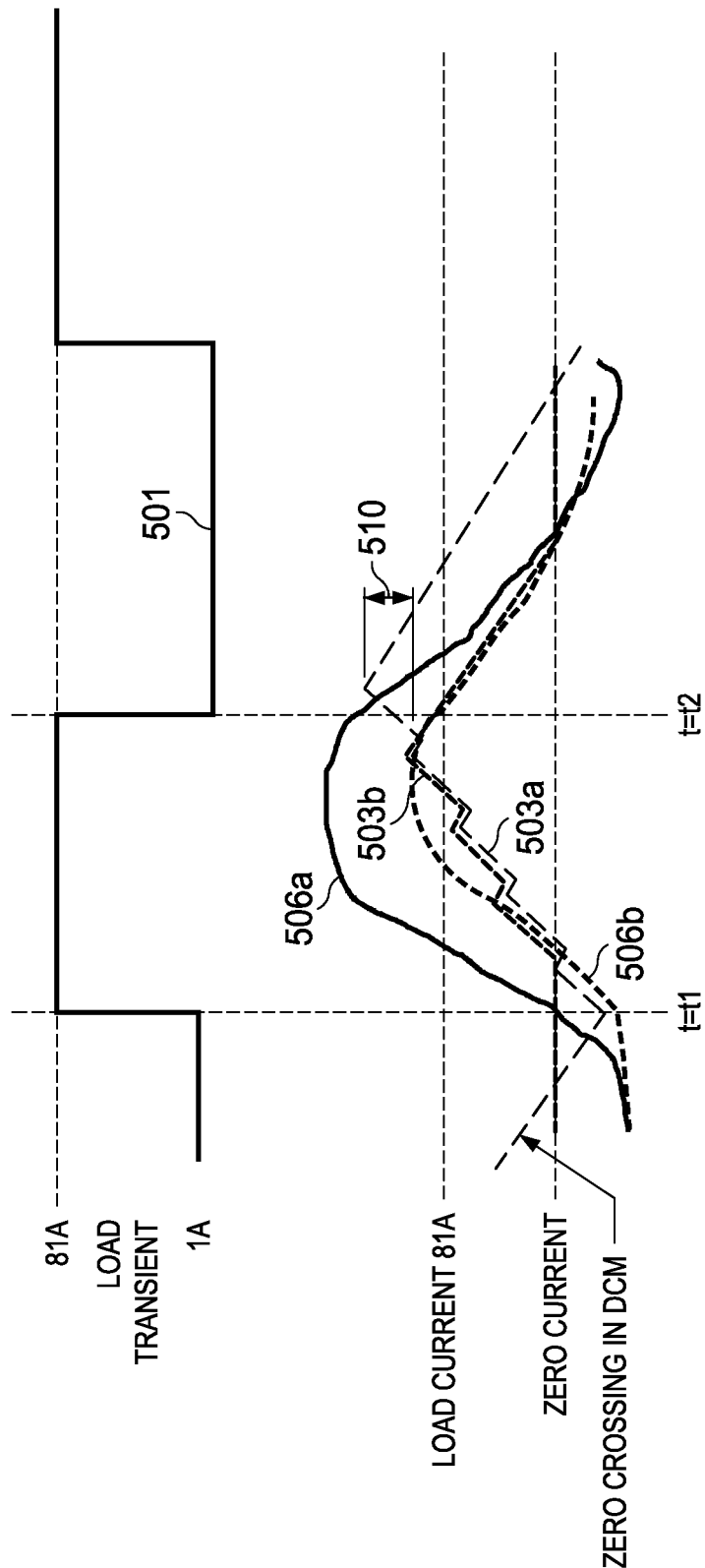

FIG. 4 is a graph showing inductor current, driver pulses, and output voltage generated in response to a load transient in the controller circuit of FIG. 1A using a skip modulator; and FIG. 5 is a graph that illustrates the difference in current build up between the circuit of FIG. 1A with and without circulating current modulation.

DETAILED DESCRIPTION

This disclosure describes a controller circuit for a DC-DC converter that provides improved output voltage response to a load transient by temporarily forcing the converter drivers to operate in a discontinuous conduction mode ("DCM"). This technique is applicable to single phase converters, multi-phase converters, and isolated and non-isolated step-down converters.

FIG. 1A is a block diagram illustrating a DC-DC controller circuit 100. The controller circuit 100 includes three driver circuits 101, 102, 103, each driver circuit coupled to a respective power stage 111, 112, 113, such as step-down (buck) converters, to provide pulses for driving the power stages. The power stages 111, 112, 113 generate three phased outputs $I1_{OUT}$, $I2_{OUT}$ and $I3_{OUT}$, respectively, which are then joined. The controller circuit regulates these currents to form the output voltage $V_{OUT}$.

Figure 1B:
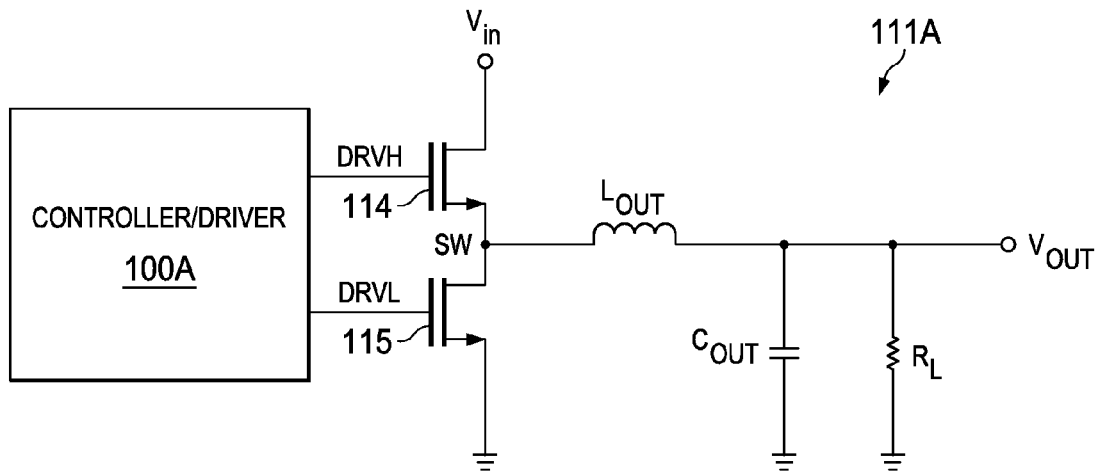
FIG. 1B is a block diagram of a simplified converter circuit.

The power stages 111, 112, 113 are generally well known and may be implemented with numerous different embodiments, but need not be described in detail herein. For example, a simplified embodiment showing a power stage 111A is illustrated in FIG. 1B, where an input voltage $V_{IN}$ is converted to a lower output voltage $V_{OUT}$ by the controller/driver 100A driving the power stage circuit 111A. The input voltage $V_{IN}$ is modulated using controller/driver 100A and power stage 111A to develop current through inductor $L_{OUT}$, to store and release energy into the output capacitor $C_{OUT}$, and to produce the output voltage $V_{OUT}$, e.g., across a load resistance $R_{LOAD}$. The input voltage $V_{IN}$ is modulated in well known manner through a high side switch 114 that is driven by a drive signal DRVH and a low side switch 115 that is driven by a drive signal DRVL.

Circulating current is typically present in a converter circuit where the load current changes dynamically and is a significant addition to the load transients. For example, during a load release, the CPU can suddenly enter a low power state and stop taking current. In a typical example, the CPU current quickly drops from 80 A to 1 A. Hence, the inductor energy needs to be dumped into the output capacitor. Due to the inductor energy dump, the output voltage reaches higher than the reference voltage to which the output voltage is regulated. The response of the controller to this event is to turn on the low side switch, which discharges the output voltage at the rate Vo/L to the reference voltage. In this process, however, the inductor builds negative current. When the output reaches the reference voltage, the inductor negative current is maximum, and the controller has to bring the inductor current back to a low load current from the negative current.

When the inductor is at its peak negative current, if a load insertion happens, i.e., the CPU current quickly increases to 80 A due to increased activity on the processor, the inductor has to transition from the negative peak current to the positive load current. For example, if the negative peak current is −15 A, then the inductor has to go from −15 A to +80 A, and the output capacitor is discharged with higher current, e.g., 80 A+15 A. This event thus causes a larger undershoot than an 80 A transient would have caused. The closed loop of the converter reacts to the undershoot and builds a higher positive current in the inductor to bring the output voltage back to its nominal voltage.

At the peak of the positive inductor current, if a load release happens, higher inductor energy is transferred to $C_{OUT}$ causing higher overshoot. The extra negative current and positive current that builds in the inductor, i.e., higher than the CPU load current, is called circulating current.

The solution presented herein is to dynamically modulate an additional signal that forces the driver circuits to operate in DCM when overshoot happens. This stops the inductor from building negative current, and stops the loop from building higher positive currents. Hence, the circulating current is stopped, and the overshoot and undershoot of the output voltage is reduced.

Returning to the controller circuit 100 of FIG. 1A, driver circuit 101 generates signal DRVH1 to drive the high side switch of the first regulator 111 and signal DRVL1 to drive the low side switch of the first regulator; driver circuit 102 generates signal DRVH2 to drive the high side switch of the second regulator 112 and signal DRVL2 to drive the low side switch of the second regulator; and driver circuit 103 generates signal DRVH3 to drive the high side switch of the third regulator 113 and signal DRVL3 to drive the low side switch of the third regulator.

A phase manager circuit 120 sequences the pulse width modulated signals PWM1, PWM2 and PWM3 into the corresponding driver 101, 102, 103 by interleaving the phases in order to minimize output ripple. The drivers 101, 102, 103 are also controlled by a DCM enable signal DCM, which is common to all driver circuits and is provided to each of the driver circuits by a DCM modulator 140.

The phase manager circuit 120 receives its input from the output of a comparator 130. The comparator 130 compares two input signals, DROOP and ISUM. The DROOP signal is coupled to the non-inverting input of the comparator 130, and is the error voltage from a feedback circuit of the power stages 111, 112, 113, generated as an output of comparator 150. The ISUM signal is coupled to the inverting input of the comparator 130, and is the total inductor current, i.e., the sum of the inductor currents in each of the power stages 111, 112, 113.

The amplifier 150 compares a voltage from amplifier 160 coupled to the non-inverting input with a signal COMP coupled to the inverting input. The signal COMP is generated as a feedback signal from node 155, which is at the interconnection of series coupled resistors R1 and R2. Resistor R1 is coupled to the output of amplifier 150 (i.e., the signal DROOP), while resistor R2 is coupled to a reference voltage REF.

The amplifier 160 compares a reference voltage DAC at the non-inverting input with the output voltage $V_{OUT}$ at the inverting input.

Figure 1C:
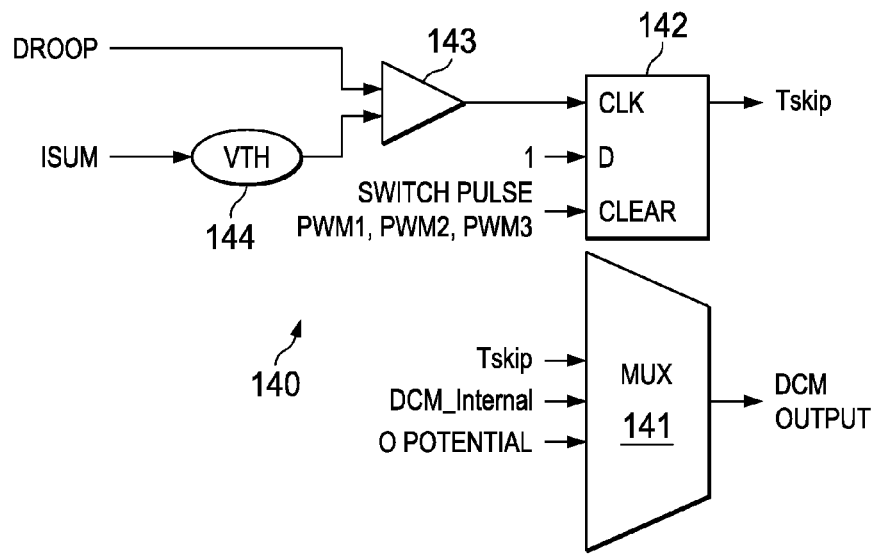
FIG. 1C is a block diagram of the skip modulator circuit of FIG. 1A.

The signals DROOP and ISUM are also provided to the DCM modulator 140, which is illustrated in more detail in FIG. 1C.

The signals referred to above have the following relationships:

$$ISUM = A \times \Sigma_0^n (I_L \times R_L);$$

where $I_L$=inductor current for each converter; $R_L$=series resistance for each inductor; A=internal gain, e.g. 12;

$$ADROOP = (1 + R1/R2)$$

$$V_{OUT} = DAC - \left(\frac{ISUM}{ADROOP}\right)$$

In normal operation of the controller 100, the signal DCM remains high and the controller is operated in a continuous conduction mode ("CCM"). However, as discussed in more detail below, the signal DCM will change to low in order to force the controller 100 into a discontinuous conduction mode ("DCM"). When the output voltage $V_{OUT}$ is higher than the voltage reference DAC at amplifier 160, it forces the DROOP signal to be less than the voltage reference REF. The voltage reference DAC is generated by the processor as a digital signal, but is converted to an analog signal that may range from 0.25V to 2.5V depending on the processor. The voltage reference REF is a common mode voltage reference.

Since the total inductor current ISUM cannot change instantaneously, there is a period of time when the DROOP signal is less than the inductor current ISUM, and during this period of time the skip modulator 140 sets the signal DCM to low.

Referring to FIG. 1C, DCM modulator 140 generates the DCM signal as the output of a multiplexor 141. The multiplexor 141 receives three input signals: TSKIP; DCM_INTERNAL; and ground. The DCM_INTERNAL signal is generated by the processor as a logical indicator of the power demand state. In one state, the power demand is high, and DCM_INTERNAL is set to high. In another state, the power demand is low, and DCM_INTERNAL is set to low.

The TSKIP signal is generated as an output of D latch 142. The D input to the latch 142 is a constant high signal or logical one, and this level is maintained at the output TSKIP until the clear or reset input of the latch is activated by the signal SWITCH PULSE, which is the combination or logical OR of PWM pulses (PWM1, PWM2 and PWM3) from the phase manager 120. The clock input of latch 142 is coupled to the output of comparator 143.

The comparator 143 compares the DROOP signal at the non-inverting input and the ISUM signal at the inverting input to generate the trigger for the clock input of the latch 142. The ISUM signal must exceed a threshold 144 that is set to be greater than the ripple voltage. For example, a typical ripple voltage is 25 mV, and an appropriate threshold may be set at 25% above the typical ripple voltage. The threshold may be configured as a programmable input to the controller circuit. Comparing the DROOP signal and the ISUM signal gives information about whether the output is going to overshoot above the DAC voltage.

Figure 2:
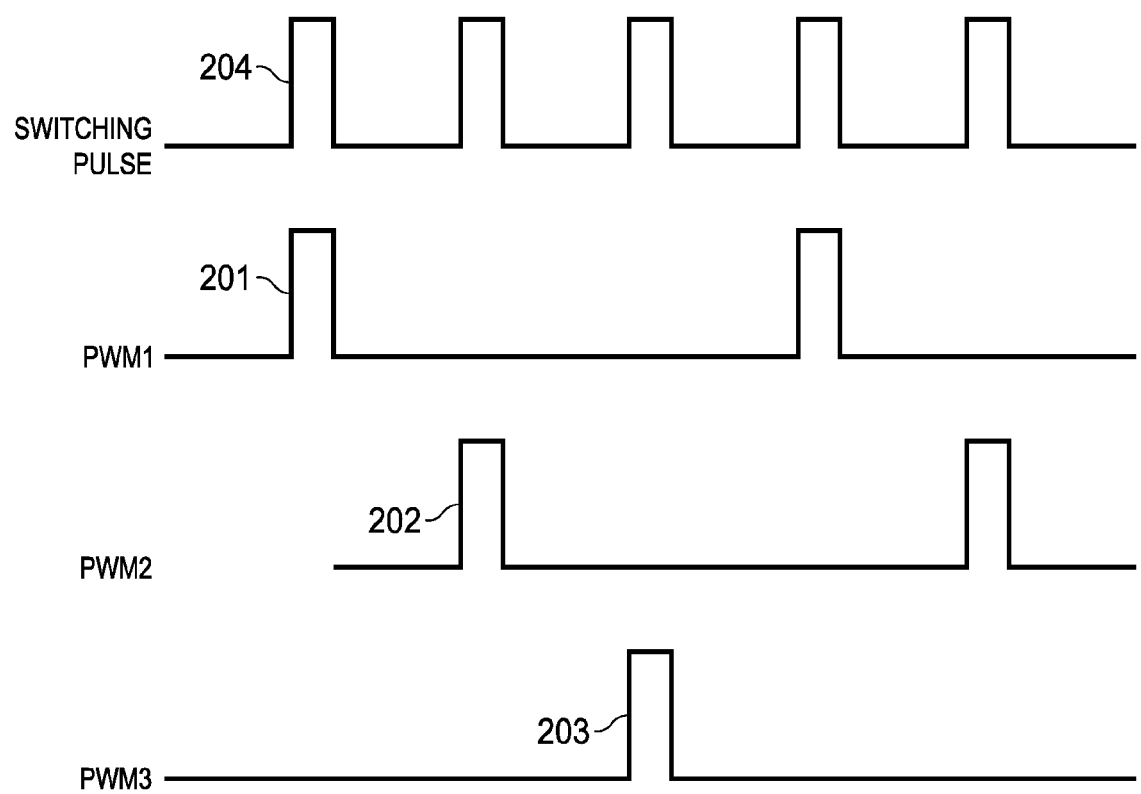
FIG. 2 is a graph showing driver pulses for each phase as well as the interleaved switching pulse for all phases as used in the operation of the controller circuit of FIG. 1A.

FIG. 2 illustrates phase interleaving. For example, waveform 201 shows the pulse associated with PWM1, waveform 202 shows the pulse associated with PWM2, and waveform 203 shows the pulse associated with PWM3. Waveform 204 is the switching pulse that results from the interleaved pulses.

Figure 3:
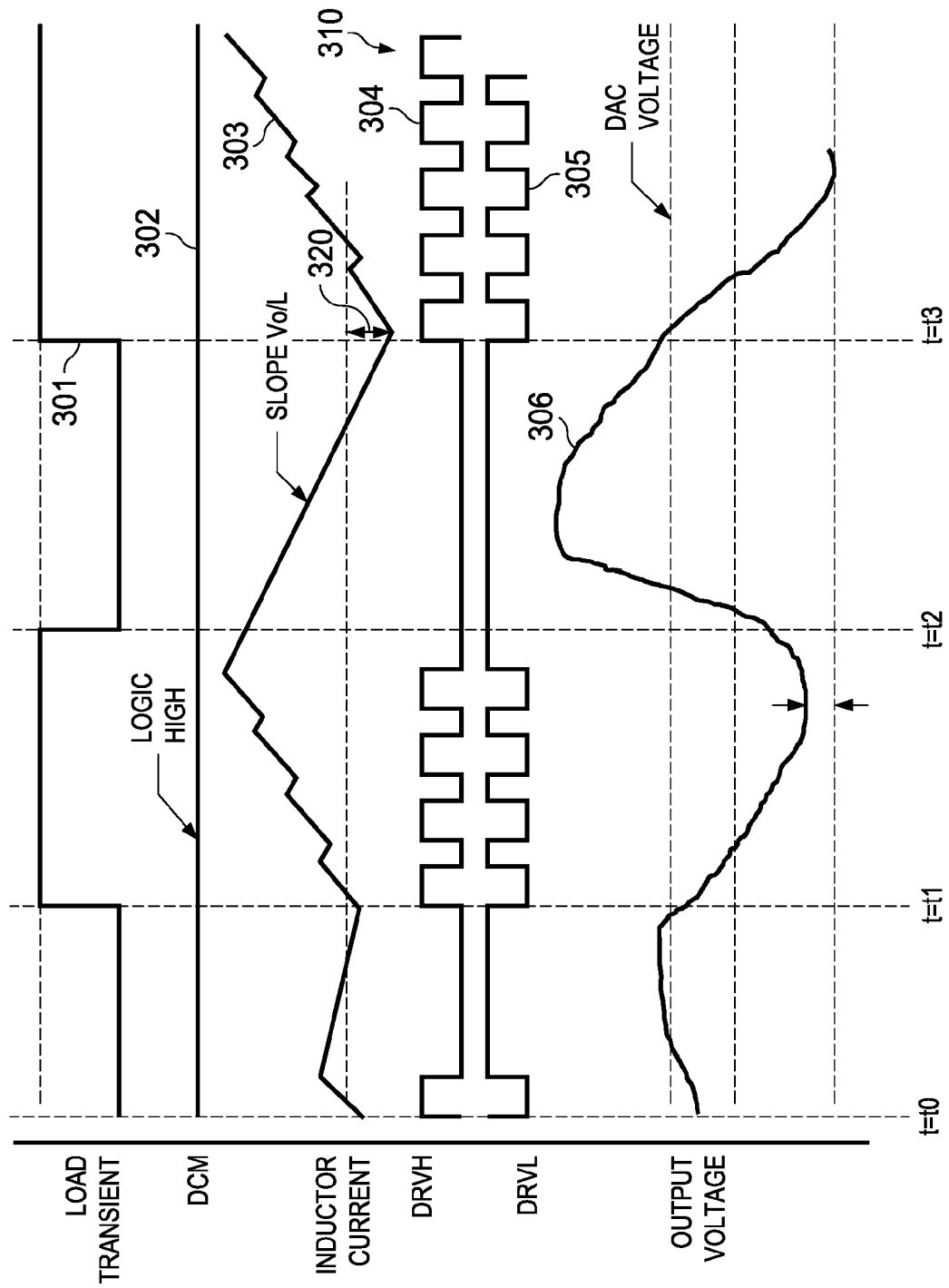
FIG. 3 is a graph showing inductor current, driver pulses, and output voltage generated in response to a load transient in the controller circuit of FIG. 1A without using a skip modulator.

FIG. 3 illustrates several of the waveforms that result from operation of controller circuit 100 without using DCM modulation, including waveform 301 for the load current; waveform 302 for the DCM signal; waveform 303 for the inductor current; waveform 304 for the high side PWM signal (e.g., DRVH); waveform 305 for the low side PWM signal (e.g., DRVL); and waveform 306 for the output voltage.

At time=t0, the converter is in steady state CCM operation and the load current is 1 A as shown by waveform 301. As the current drains from the inductor and ramps down (waveform 303), the output voltage (waveform 306) increases to just above the DAC voltage, which is the normal ripple voltage.

At time=t1, the load current jumps to 81 A (waveform 301), for example in 100 ns (typical). The phase manager generates a number of high side PWM pulses (waveform 304) and corresponding low side PWM pulses (waveform 305) in order to quickly increase the supply current. The inductor current ramps up (waveform 303) while the output voltage decreases until the total inductor current (i.e., the sum of all three inductor currents) increases greater than load current (waveform 306).

At time=t2, the load current decreases to 1 A, and the inductor current ramps down with a slope of $V_{OUT}/L$, undershooting the target for inductor current=0 A, i.e., there is a negative current offset 320. The output voltage $V_{OUT}$ also overshoots its target voltage DAC. The inductor current continues to go further negative until the output voltage $V_{OUT}$ reaches DAC.

At time=t3, the output voltage $V_{OUT}$ reaches DAC, but another load transient occurs spiking the load current to 81 A. Now the effective load insertion $I_{EFFECTIVE}$ can be quantified as:

$$I_{EFFECTIVE} = I_{LOAD}(81 \text{ A}) + I_{OFFSET}(\text{inductor})$$

and the cycle is repeated, but now with an extra pulse 310 at the high side PWM (waveform 304) due to the negative offset current (since the effective current is greater than 81 A).

FIG. 4 illustrates corresponding waveforms that result from operation of controller circuit 100 using DCM modulation, including waveform 401 for the load current; waveform 402 for the DCM signal; waveform 403 for the inductor current; waveform 404 for the high side PWM signal (e.g., DRVH); waveform 405 for the low side PWM signal (e.g., DRVL); and waveform 406 for the output voltage.

At time=t0, the converter is again in steady state CCM operation and the load current is 1 A (waveform 401). As the current drains from the inductor and ramps down (waveform 403), the output voltage increases to just above the DAC voltage (waveform 406), just as in FIG. 3. At time=t1, the load current jumps to 81 A (waveform 401). The high side PWM pulses (waveform 404) and low side PWM pulses (waveform 405) are generated in order to quickly increase the supply current, and the inductor current ramps up (waveform 403) while the output voltage decreases (waveform 406), just as in FIG. 3, but now resulting in a smaller voltage dip due to zero negative current.

At time=t2, the load is released and the load current decreases to 1 A (waveform 401), while the inductor current ramps down with a slope of $V_{OUT}/L$ (waveform 403). The output voltage $V_{OUT}$ again overshoots its target voltage DAC (waveform 406), but that condition now causes the DCM signal (waveform 402) to be pulled low. The driver is thus forced to operate in DCM mode (thus stopping negative current in the inductor) until a PWM pulse (waveform 404) is presented at time=t3, indicating that the output voltage (waveform 406) has dropped below DAC, and ignoring the increased load demand at time=t4 (waveform 401).

Thus, when the inductor current crosses zero due to DCM modulation, the zero crossing detector activates and pulls the low side gate signal DRVL low thereby preventing further negative current at the inductor. The output voltage $V_{OUT}$ remains higher than DAC and is also pulled down by leakage current.

When a load insertion occurs, e.g., the load jumps from 1 A to 81 A, the inductor current ramps up from 0 A, instead of from a negative current as in FIG. 3 without DCM modulation. In fact, the undershoot is less with the DCM modulation because the voltage output $V_{OUT}$ is higher than DAC when the load insertion occurs.

Thus, a larger undershoot of the inductor current below zero current causes a larger undershoot of the output voltage. Further, by reducing the undershoot, the overshoot is also reduced, and utilizing the DCM modulation technique described above reduces undershoot.

This principle is further illustrated in FIG. 5, which shows the build up of inductor current both with and without DCM modulation. Waveform 506a illustrates the DROOP signal without DCM modulation, while waveform 506b illustrates the DROOP signal with DCM modulation. Further, waveform 503a illustrates the inductor current without DCM modulation, while waveform 503b illustrates the inductor current with DCM modulation. The extra inductor current buildup 510 in waveform 503a overshoots the required load current and is due to the negative current that undershoots the zero current minimum. This extra current buildup increases overshoot when load release happens. However, the inductor current shown in waveform 506b exhibits decreased undershoot and overshoot in the DCM mode.

Although illustrative embodiments have been shown and described by way of example, a wide range of alternative embodiments is possible within the scope of the foregoing disclosure.

The invention claimed is:

1. A circuit for improved output voltage response for load transients in a DC-DC converter, comprising:
   a driver circuit having a first input, a second input, and an output, the output coupled to drive a converter circuit;
   a first control circuit coupled to the first input of the driver circuit and configured to generate a modulated signal by comparing an output voltage from the converter circuit with a first reference voltage; and
   a second control circuit coupled to the second input of the driver circuit and configured to generate a DCM enable signal having a first state and a second state, wherein the DCM enable signal is in the second state when an abnormal circulating current is detected in an output filter of the converter, wherein the driver circuit operates in a continuous conduction mode when the DCM enable signal is in the first state and the driver circuit operates in a discontinuous conduction mode when the DCM enable signal is in the second state, wherein the second control circuit is configured to generate the DCM enable signal by comparing the output voltage from the converter circuit with a current reference signal representing an inductor current from the converter circuit;
   the first control circuit further comprising:
   a first comparator having an output coupled to the driver circuit and comparing an output from a first amplifier with the current reference signal;
   the first amplifier having its output coupled to the first comparator and comparing an output from a second amplifier with a feedback signal; and
   the second amplifier having its output coupled to the first amplifier and comparing the output voltage from the driver circuit with the first reference voltage;
   wherein the DCM enable signal is in the first state when the first reference voltage is greater than the output voltage, and the DCM enable signal is in the second state when the output voltage is greater than the first reference voltage.

2. The circuit of claim 1, wherein the feedback signal is generated at the output of the first amplifier.

3. The circuit of claim 2, further comprising a pair of resistors coupled in series between the output of the first amplifier and a second reference voltage, wherein the feedback signal is generated at an interconnection of the pair of resistors.

4. The circuit of claim 1, wherein the second control circuit compares the output of the first amplifier with the current reference signal.

5. The circuit of claim 1, the second control circuit further comprising:
 a second comparator comparing the output of the first amplifier with the current reference signal and generating an output;
 a latch having a clock input coupled to the output of the second comparator, a latch input coupled to a logical one, a reset input coupled to the first input of the driver circuit, and a latch output that is high when the clock input is triggered and low when the reset input is triggered; and
 a multiplexor having a first input coupled to the output of the latch, a second input coupled to a power state signal, and generating the DCM enable signal in the first state when the latch output is high, and generating the DCM enable signal in the second state when the latch output is low.

6. A circuit as in claim 5, further comprising:
 a plurality of driver circuits, each driver circuit having a first input, a second input, and an output, each output coupled to drive a corresponding converter circuit;
 wherein the first control circuit generates a sequence of modulated signals, each modulated signal generated by comparing the output voltage from the corresponding converter circuit with the first reference voltage, each modulated signal coupled respectively to the first input of a corresponding driver circuit;
 wherein the second control circuit is commonly coupled to the second input of each driver circuit.

7. The circuit of claim 6, the first control circuit further comprising:
 a phase manager circuit having a plurality of outputs and generating the sequence of modulated signals, each output coupled to a respective driver circuit for providing a respective one of the sequence of modulated signals.

8. The circuit of claim 7, wherein the reset input of the latch is coupled to a combination of the modulated signals.

9. A circuit for improved output voltage response for load transients in a DC-DC converter, comprising:
 a plurality of driver circuits, each driver circuit having a first input, a second input, and an output, each output coupled to drive a corresponding converter circuit;
 a first control circuit for generating a sequence of modulated signals, each modulated signal generated by comparing the output voltage from the corresponding converter circuit with the first reference voltage, each modulated signal coupled respectively to the first input of a corresponding driver circuit;
 a second control circuit commonly coupled to the second input of each driver circuit and configured to generate a DCM enable signal having a first state and a second state, wherein the DCM enable signal is in the second state when an abnormal circulating current is detected in an output filter of the converter, and wherein the driver circuit operates in a continuous conduction mode when the DCM enable signal is in the first state and the driver circuit operates in a discontinuous conduction mode when the DCM enable signal is in the second state, and
 the second control circuit including:
 a second comparator comparing the output of the first amplifier with the current reference signal and generating an output;
 a latch having a clock input coupled to the output of the second comparator, a latch input coupled to a logical one, a reset input coupled to the first input of each driver circuit, and a latch output that is high when the clock input is triggered and low when the reset input is triggered; and
 a multiplexor having a first input coupled to the output of the latch, a second input coupled to a power state signal, and generating the DCM enable signal in the first state when the latch output is high, and generating the DCM enable signal in the second state when the latch output is low.

10. A circuit for improved output voltage response for load transients in a DC-DC converter, comprising:
 a plurality of driver circuits, each driver circuit having a first input, a second input, and an output, each output coupled to drive a corresponding converter circuit;
 a first control circuit for generating a sequence of modulated signals, each modulated signal generated by comparing the output voltage from the corresponding converter circuit with the first reference voltage, each modulated signal coupled respectively to the first input of a corresponding driver circuit, the first control circuit further comprising:
 a first comparator having an output coupled to the phase manager circuit and comparing an output from a first amplifier with the current reference signal;
 the first amplifier having its output coupled to the first comparator and comparing an output from a second amplifier with a feedback signal; and
 the second amplifier having its output coupled to the first amplifier and comparing the output voltage from the driver circuits with the first reference voltage;
 wherein the DCM enable signal is in the first state when the first reference voltage is greater than the output voltage, and the DCM enable signal is in the second state when the output voltage is greater than the first reference voltage;
 a second control circuit commonly coupled to the second input of each driver circuit and configured to generate a DCM enable signal having a first state and a second state, wherein the DCM enable signal is in the second state when an abnormal circulating current is detected in an output filter of the converter, and wherein the driver circuit operates in a continuous conduction mode when the DCM enable signal is in the first state and the driver circuit operates in a discontinuous conduction mode when the DCM enable signal is in the second state wherein the second control circuit is configured to generate the DCM enable signal by comparing the output voltage from the converter circuits with a current reference signal representing an inductor current from the converter circuits.

11. The circuit of claim 10, the first control circuit further comprising:
 a phase manager circuit having a plurality of outputs and generating the sequence of modulated signals, each output coupled to a respective driver circuit for providing a respective one of the sequence of modulated signals.

12. A method for providing improved output voltage response for load transients in a DC-DC converter circuit, comprising:
    operating a driver circuit in a continuous conduction mode when an output voltage of the converter circuit exceeds a reference voltage; and
    operating the driver circuit in a discontinuous conduction mode when an abnormal circulating current is detected in an output filter of the converter circuit;
    detecting the abnormal circulating current by comparing the output voltage of the converter circuit with a current reference signal representing an inductor current from an output filter of the converter circuit;
    generating a first PWM (pulse width modulated) signal by comparing the output voltage of the converter circuit with a first reference voltage;
    generating a second PWM signal by comparing the output voltage of the converter circuit with a current reference signal representing an inductor current from an output filter of the converter circuit;
    providing the first PWM signal to the driver circuit during the continuous conduction mode of operation; and
    providing the second PWM signal to the driver circuit during the discontinuous conduction mode of operation, wherein overshoot or undershoot is prevented to allow the converter to respond to increased load demands faster than would occur if negative inductor current work allowed.

13. The method of claim 12, further comprising:
    operating a plurality of driver circuits in the continuous conduction mode when the output voltage exceeds the reference voltage; and
    operating the plurality of driver circuits in a discontinuous conduction mode when the abnormal circulating current is detected.

14. The method of claim 13, further comprising:
    generating a DCM enable signal when the output voltage of the converter circuit exceeds the current reference signal; and
    providing the DCM enable signal to each of the driven circuits.

* * * * *